United States Patent [19]
Gee

[11] 3,893,531
[45] July 8, 1975

[54] HYDROSTATIC DRIVE MEANS FOR AMPHIBIOUS VEHICLE UNDERCARRIAGE

[75] Inventor: James E. Gee, Washington, Ill.
[73] Assignee: Caterpillar Tractor Co., Peoria, Ill.
[22] Filed: June 24, 1974
[21] Appl. No.: 482,509

[52] U.S. Cl. .................. 180/6.48; 37/54; 61/46.5; 61/69 R; 74/606; 114/16 R; 115/1 R
[51] Int. Cl.² ........................................ B62D 11/04
[58] Field of Search .......... 180/6.48, 6.5, 6.7, 9.46; 114/16 R; 115/1 R; 61/69 R, 46.5; 37/54, 56; 74/606

[56] References Cited
UNITED STATES PATENTS
| | | | |
|---|---|---|---|
| 2,782,656 | 2/1967 | McCarthy | 74/606 |
| 3,125,975 | 3/1964 | Alsager et al. | 114/16 R |
| 3,500,648 | 3/1970 | Daniell | 114/16 R |

*Primary Examiner*—David Schonberg
*Assistant Examiner*—John A. Pekar
*Attorney, Agent, or Firm*—Ralph E. Walters

[57] ABSTRACT

A crawler-type traction unit for use with amphibious vehicles. A conventional land-based vehicle crawler-type traction unit is adapted for amphibious use including operation at "surf zone" depth. The chambers in conventional traction units customarily employed for housing steering clutches are employed to house hydraulic motors which are coupled to the conventional drive component. Such chambers are completely sealed and filled with a liquid. Openings through which drive components used in land-based traction units are closed with bellows so that, upon submergence of the unit, the pressure within such chamber is equalized to the ambient water pressure thereby precluding the entry of foreign material, such as water, into the compartment housing the fluid motors and/or drive components.

4 Claims, 4 Drawing Figures

3,893,531

HYDROSTATIC DRIVE MEANS FOR AMPHIBIOUS VEHICLE UNDERCARRIAGE

BACKGROUND OF THE INVENTION

This invention relates to vehicles for performing work in so-called "surf zones" such as dredging operations or the like and, more particularly, to crawler-type traction units to be employed with such vehicles.

Pertinent prior art includes U.S. Pat. Nos. 2,782,656; 3,489,235; 3,683,521; and 3,757,438.

Land-based material shortages have been instrumental in promoting recent interest and efforts in developing earth-moving equipment capable of operating offshore areas such as "surf zones" (depths of up to about 50 feet) as on the Continental Shelf. Other marine applications for vehicles, such as providing improved dredging equipment, have also stimulated such interest and efforts.

Heretofore, there have been a variety of proposals for working vehicles which may operate in various degrees of submergence. One such proposal is set forth in the commonly assigned application of Gee et al, Ser. No. 457,493, entitled "Vehicle For Surf Zone Work" and filed Apr. 3, 1974. The vehicle therein disclosed employs crawler-type traction units which may operate fully submerged for moving the vehicle. As will be appreciated, different problems are encountered in the operation of crawler-type traction units operated at substantial depths in surf zones than those encountered when the traction units are operating on land or only in a partially submerged condition at depths of 3 or 4 feet. While such problems are not insurmountable, difficulty has been experienced in solving them inexpensively in terms of fabricating problem-free traction units capable of operating at substantial depths with a minimum of expense.

SUMMARY OF THE INVENTION

It is the principal object of the invention to provide a new and improved crawler-type traction unit for use on amphibious vehicles and which may operate at substantial depths, such as those encountered in the surf zone. More specifically, it is an object of the invention to provide such a unit wherein fabrication cost problems are overcome through the extensive use of parts conventionally employed in traction units intended solely for land-based operation.

An exemplary embodiment of the invention achieves the foregoing object through the employment of conventional track frame and roller assemblies as well as conventional track chains united by a conventional gear box such as that disclosed in U.S. Pat. No. 2,782,656, which includes a central chamber flanked by a pair of chambers intended to receive the steering clutches when employed in a vehicle intended for land-based operations. Openings interconnect the two steering clutch chambers with the central chamber as well as the two steering clutch chambers with associated track frames.

Conventional drive components, including a track chain sprocket, the driving gear therefor and pinions for the drive gear are retained and a seal is established about such driving components so that foreign material cannot enter the associated steering clutch chamber through the opening therein in which such components are disposed.

Each steering clutch chamber mounts a hydraulic motor having a rotary output shaft connected directly by a coupling to the pinion. Each such chamber is further filled with a body of liquid and the opening of such chamber to the central chamber is closed by a diaphragm-like seal.

In the preferred embodiment, to maximize the drive capability of the traction unit, large hydraulic motors are employed and are housed in the conventional steering clutch chamber in such a way as to partially extend through the opening therein into the central chamber. A bellows within the central chamber sealingly closes the opening from the same into each steering clutch chamber in such a way as to further contain that portion of the hydraulic motor received in the central chamber.

The use of the bellows insures that the pressure of the interior of each steering clutch chamber will equal the ambient water pressure regardless of the depth of submergence thereby precluding the entry of foreign material, such as water into the steering clutch chambers and the drive components.

Other objects and advantages will become apparent from the following specification taken in conjunction with the accompanying drawings.

DESCRIPTION OF THE PREFERRED EMBODIMENT

Figure 1:
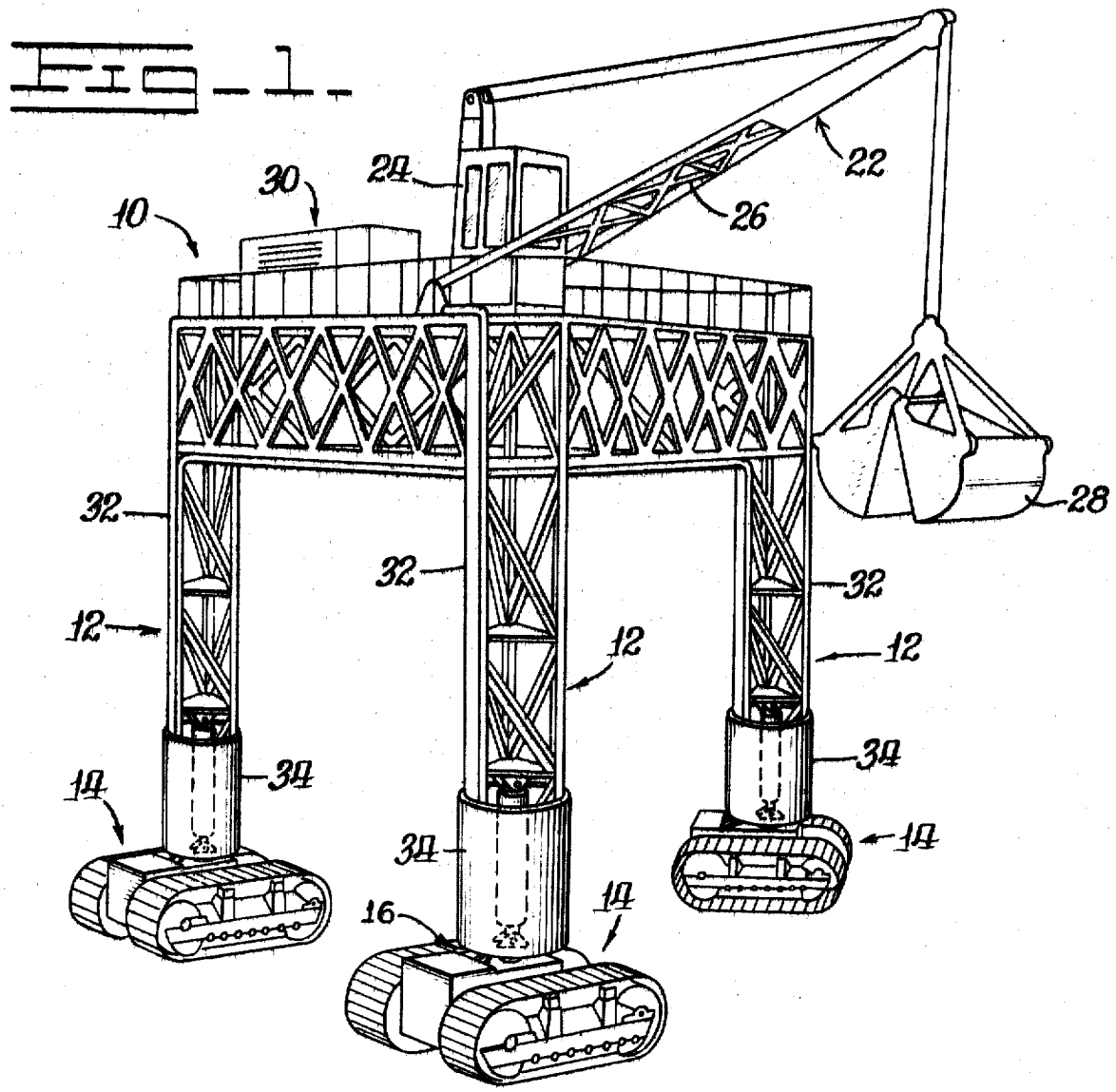
FIG. 1 is a perspective view of an amphibious vehicle intended for use in the surf zone and employing traction units made according to the invention.
Figure 2:
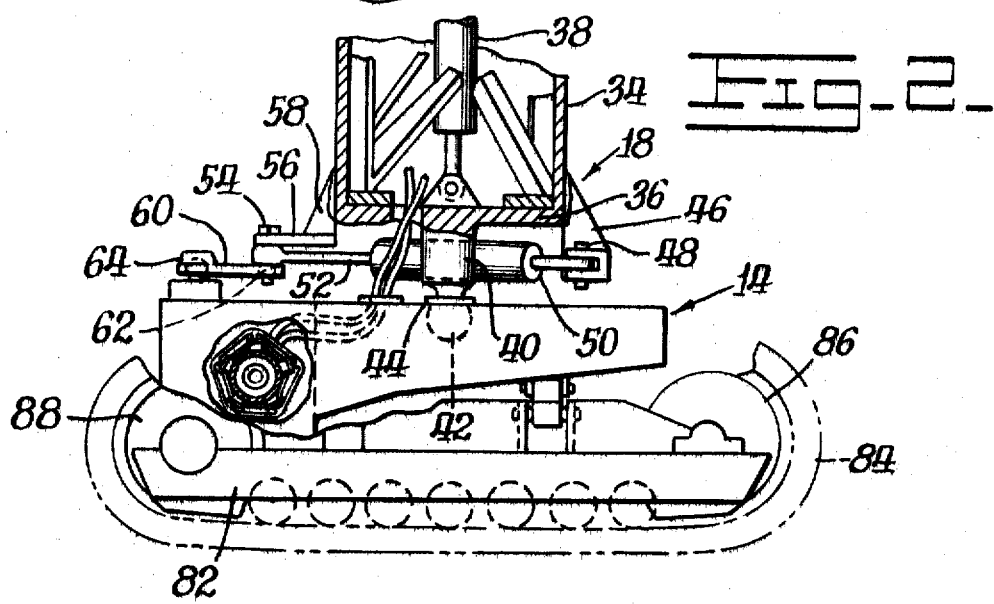
FIG. 2 is an enlarged view of a traction unit made according to the invention showing one means of connecting the same to the vehicle.

A vehicle for surf zone work employing a traction unit, made according to the invention, is illustrated in FIG. 1 and is seen to include a platform, generally designated 10, including a plurality of at least three, spaced, depending legs, generally designated 12, and each having a traction unit, generally designated 14, associated with the lower end thereof. Each traction unit 14 is connected to its associated leg 12 by a connection, generally designated 16, which allows limited, substantially universal movement of the traction unit 14 on the leg. The general organization is completed by a steering mechanism, generally designated 18 as seen in FIG. 2.

The platform 10 may take on any desired form, which form will be dependent upon the nature of the work to be performed by the vehicle. In the embodiment illustrated in FIG. 1, the platform 10 is triangular with the legs 12 located at each apex thereof. The platform mounts work performing means, generally designated 22, which may be operated from a cab 24 housing controls (not shown). As illustrated, the work performing means 22 include a boom 26 for controlling a clam shell bucket 28, although it is to be understood no restriction to any particular form of work performing means is intended. Lastly, the platform 10 may mount a power unit, generally designated 30, which may provide power for the work performing means 22 as well as the traction units 14.

Figure 3:
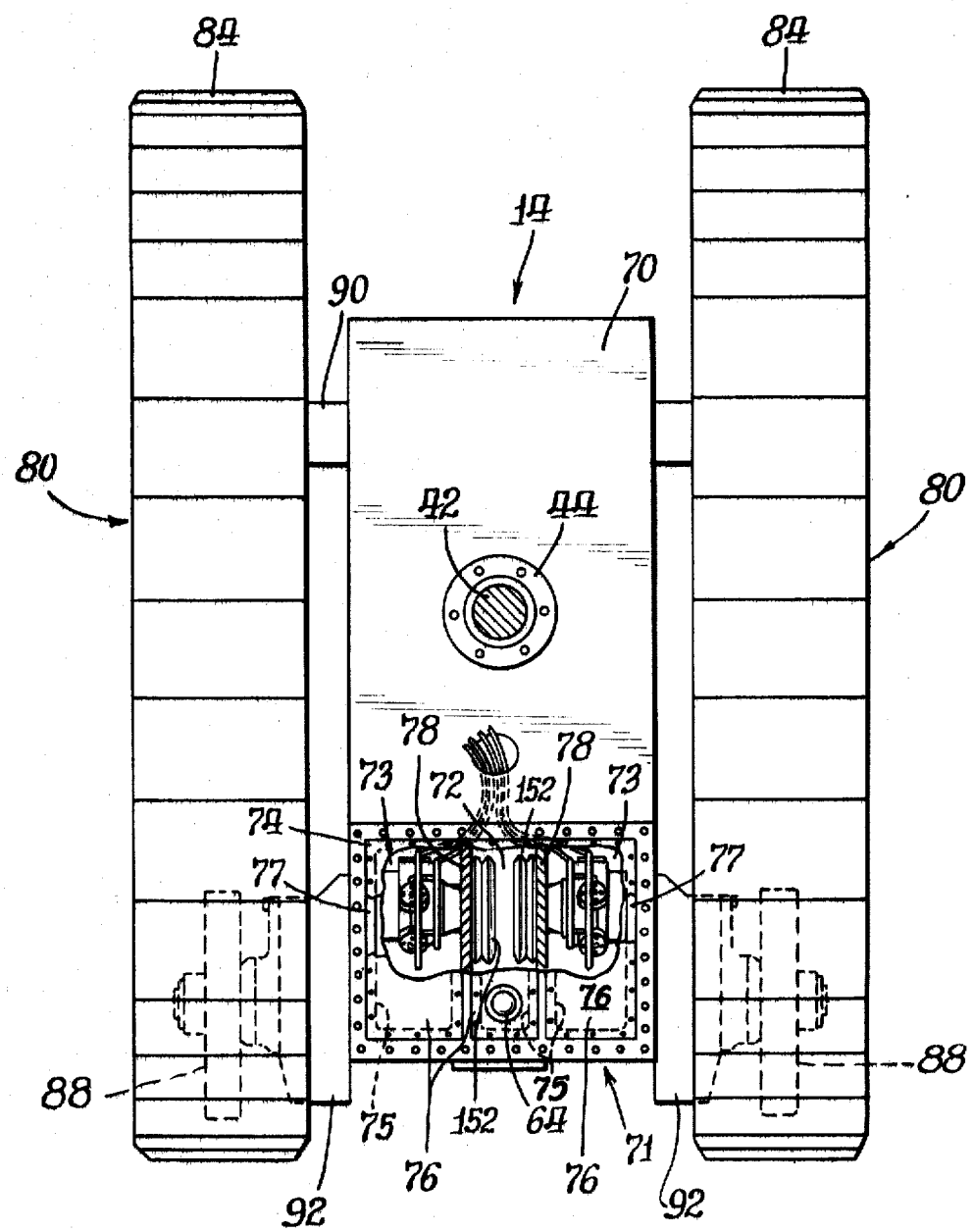
FIG. 3 is a plan view of a traction unit with parts broken away for clarity.

Turning now to the legs 12, as best seen in FIGS. 1 and 3, each includes a first leg element 32 which is triangular in cross section and which may be formed of a plurality of structural members interconnected according to good engineering practice. Each leg 12 further includes a second leg element 34 which is generally cylindrical in cross section and which slidably receive the apices of the triangular cross section of the first leg element 32 by means of slide bearings (not shown). The second leg element also carries a circular bottom panel or plate 36.

From the foregoing, it will be appreciated that each leg 12 is a telescoping structure, the second leg element 34 being slidable upon the first leg element 32 whereby the effective length of each leg 12 may be changed to allow the vehicle platform 10 to remain in a substantially horizontal position even though the individual legs 12 are disposed in differing depths.

To readily accomplish such an adjustment, hydraulic cylinders 38 are provided to interconnect the first and second leg elements whereby the relative position of the first and second leg elements 32 and 34 may be selectively varied.

Turning now to FIG. 2, according to one embodiment of the invention, the traction unit 14 is secured to the bottom plate 36 of a corresponding leg element 34 by means of a downwardly extending projection 40 which terminates in a ball 42 which, by means 44, is secured in an appropriate recess within the traction unit 14. In other words, the elements 42 and 44 define a heavy duty ball joint connection between each leg 12 and an associated traction unit 14 so that the latter is universally pivotally connected to the underside of the corresponding leg 12. Preferably, the ball joint connection is located relatively centrally of the traction unit 14 from the weight standpoint so that the weight of the traction unit is relatively uniformly distributed about the universal connection.

As a result of the foregoing construction, it will be appreciated that each traction unit 14 can cant at compound angles relative to its associated leg as the vehicle is travelling and the individual unit 14 encounters abrupt changes in the terrain over which it individually may be travelling.

One form of a steering mechanism is illustrated in FIG. 2 by which each traction unit 14 may be pivoted about a substantially vertical axis for steering purposes, the axis being coincident with the previously described ball joint. An outwardly and downwardly extending bracket 46, by means of a pivot pin 48, pivotally mounts one end of a hydraulic cylinder 50. The cylinder 50 includes a reciprocal output in the form of a piston rod 52 connected to an internal piston in the usual fashion. The exterior end of the rod 52 is pivotally connected by a pin 54 to a link 56 which, in turn, is pivotally connected to ears 58 on the leg element 34. In addition, a link 60 interconnects the rod 52 to the traction unit 14.

The link 60 has one end connected as by a ball joint 62 to the end of the piston rod 52. The other end of the link 60 is connected by a ball joint 64 to the traction unit 14. The rod 52 and links 56 and 60 form a scissor or toggle type steering linkage which preferably is dimensioned so that 90° of turning action may be accommodated. In this connection, it will be appreciated that the use of the ball joints 62 and 64 in connection with the link 60, provide a positive steering connection regardless of the degree of canting of a traction unit relative to its associated leg.

Figure 4:
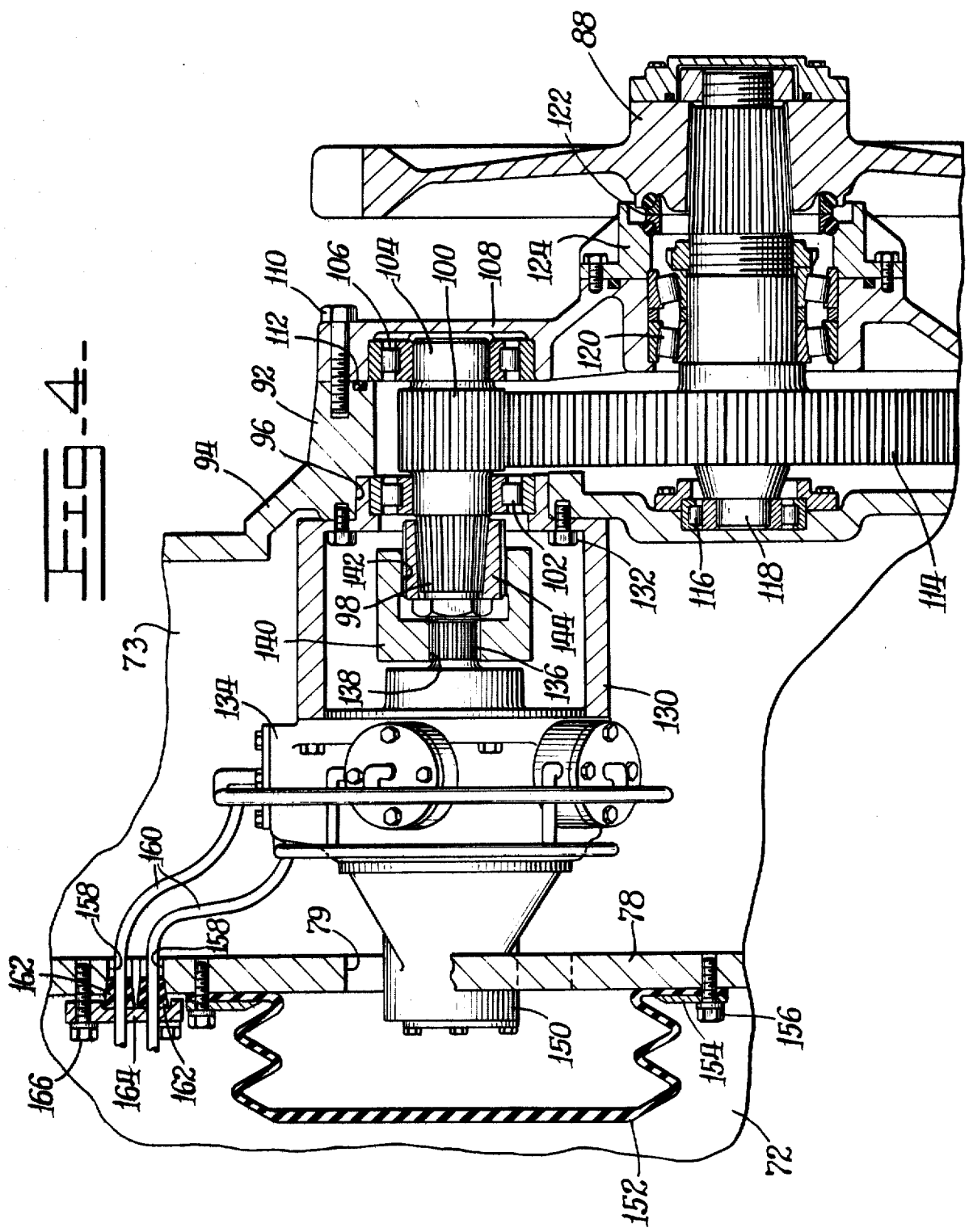
FIG. 4 is an enlarged, fragmentary, horizontal section of a drive train employed in the invention.

With reference to FIGS. 3 and 4, an exemplary traction unit is described in greater detail. The same is generally fabricated in accordance with the teachings of the commonly assigned McCarthy et al U.S. Pat. No. 2,782,656, the details of which are herein incorporated by reference, to include a central frame 70 mounting a gear box, generally designated 71. The gear box 71 includes three compartments including a central compartment 72 flanked by symmetrical compartments 73. Those skilled in the art will recognize that this construction is commercially employed in many tractors produced by the assignee of the instant application and intended for land-based use. Specifically, the compartment 72 conventionally houses a number of components including connections for a power take-off, while the compartments 73 conventionally house steering clutches.

The upper surface of the gear box 71 is defined by a plate 74 secured by the welding technique of McCarthy et al in sealing relation with the remainder of the gear box components. The plate 74 includes three openings 75, which serve as access openings to the interiors of the compartments 72 and 73. The openings 75 for the chambers 73 are normally closed by separate closure plates 76 bolted in place to sandwich a sealing gasket 77 against the upper surface of the plate 74 about the periphery of the access openings 75 for the two chambers 73. No seal is provided in connection with the closure plate 76 for the chamber 72 for, as will be seen, it is desired that water be permitted to enter the chamber 72.

The compartments 73 are separated from the compartment 72 by walls 78 and, as best seen in FIG. 4, each such wall includes an opening 79 through which driving connections from the central compartment 72 would normally extend into the steering clutch compartments 73.

The steering clutch compartments 73 are each, in turn, flanked by a track chain assembly 80 which may be conventional except as otherwise described herein. For example, and with reference to FIG. 2, the same includes a track frame 82 about which a track chain, generally designated 84 is trained. Specifically, a conventional idler sprocket 86 as well as a drive sprocket 88 are employed for this purpose and track roller assemblies, not numbered, are employed as required in a conventional way.

The specific means of interconnection of each track chain assembly 80 with the frame 70 and the gear box 71 includes a transversely extending hard bar assembly 90 as well as drive housings 92.

As best seen in FIG. 4, the drive housing 92 forms a wall for a corresponding one of the steering clutch chambers 73 opposite the wall 78 and is formed of a casting 94 or the like. The casting 94 includes an opening 96 through which drive components extend. Specifically, the tapered splined end 98 of a pinion 100 extends through the opening 96 and is journalled therein by means of bearings 102. An end 104 of the pinion 100 is journalled in bearings 106 which, in turn, are received in a cap 108 also forming part of the drive housing 92 and which is secured to the casting 94 as by bolts 110. The interface of the elements 108 and 94 is provided with an O-ring type seal 112.

Within a chamber defined by the elements 94 and 108, a drive gear 114 in mesh with the pinion 100 is journalled. Bearings 116 receive one end of a shaft 118 associated with the drive gear 114 for this purpose. Elsewhere, and within the chamber defined by the elements 94 and 108, tapered roller bearings 120 journal the shaft 118 and, to the exterior thereof, a face type floating ring seal 122 is located between a retainer 124 for the bearings 120 and the chain sprocket 88.

Those skilled in the art will recognize that the drive components thus far described are identical to those conventionally employed in a Model D-3 tractor manufactured by the assignee of the instant application, which is intended for land-based use. The only difference resides in the construction of the elements 94 and 108 as separate parts rather than as a single element and the provision of the seal 112.

Within each chamber 73, a generally cylindrical mounting collar 130 is secured by bolts 132 to the interior wall defined by the element 94. The collar 130, in turn, mounts a high capacity, hydraulic motor 134 of conventional construction and which has a splined, rotary output shaft 136. The shaft 136 is received in a splined bore 138 of a coupling element 140 which further has a splined surface 142 engaging the exterior splined surface of a sleeve 144. The sleeve 144 has an interior splined surface engaging the splined surface 98 of the pinion 100. Thus, a direct coupling is established between the output shaft 136 of the hydraulic motor 134 and the pinion 100 so that, upon energization of the hydraulic motor 134, the track chain 84 will ultimately be driven.

As alluded to previously, the hydraulic motor is of high capacity and, in order to maximize power available to drive the tracks, the same is not limited in size to the volume available within a conventional steering clutch chamber such as the chambers 73. As can be seen, portion 150 of the motor 134 extends through the opening 79 into the central chamber 72. Thus, power can be maximized through the use of the conventionally existing opening 79 in the chamber wall 78.

Diaphram means in the form of a bellows 152 is employed to close each one of the openings 79 to seal the steering clutch chamber 73. As can be seen in FIG. 4, the bellows 152 completely surrounds the opening 79 as well as the portion 150 of the hydraulic motor 134 extending into the chamber 72. The bellows 152 is held in place by a clamping ring 154 secured by a series of bolts 156 against the wall 78 within the chamber 72.

The wall 78 includes further openings 158 through which flexible hydraulic lines 160 extending from the platform 10 may pass. Stopper-like sealing members 162 surround each of the lines 160 and are forced into the opening 158 and held in place by a clamping bracket 164 secured to the wall 78 within the chamber 72 by bolts 166.

Finally, each of the chambers 73 is completely filled with hydraulic fluid or the like. Because of the seals employed and the fact that the chambers 73 are otherwise completely sealed when fabricated according to the teachings of the previously identified, commonly assigned patent to McCarthy et al, under ordinary circumstances, it will be appreciated that foreign material would be precluded from entering either of the chambers 73 or those defined by the elements 94 and 108 housing the drive components. However, it will be recognized that when traction units are employed in a substantially submerged condition, as in depths up to about fifty feet, a sizable pressure differential could exist across the wall of each of the chambers 73 which could permit foreign material, such as water, to enter such chambers and cause damage to the components contained therein. This problem is overcome in a traction unit made according to the invention by the presence of the bellows 152 which can flex so as to establish pressure equalization across the walls of the chamber 73. Thus, with no pressure differential across the walls, the various seals herein described are operative to preclude the entry of foreign materials.

From the foregoing, it will be appreciated that a traction unit made according to the invention can be inexpensively fabricated, employing readily available, conventional parts commonly used in tractors intended primarily for land-based use. Moreover, it will be recognized that the traction unit can be easily controlled under water. For example, the motors 134 are of the reversible type and by suitable control valving, the direction of fluid flow through the lines 160 may be reversed to reverse the direction of rotation of the output shaft 136 to thereby reverse the direction of movement of the track chains 84. At the same time, suitable valving means may be provided for halting all fluid flow to the lines 160 which effectively brakes the corresponding track chain 84 to accomplish abrupt turning movements. It will also be recognized that as between the two motors 134 employed in a given traction unit, fluid flow to one may be throttled with respect to fluid flow to the other to accomplish more gradual turning movements. Thus, if desired, the steering mechanism 18 previously described in FIG. 2 can be eliminated by employing hydraulic fluid flow control to provide steering.

I claim:

1. A crawler-type traction unit for amphibious vehicles comprising:
    a pair of generally parallel track frames;
    a pair of track chains, one for each track frame, trained about an associated track frame for movement therearound;
    a gear case interconnecting said track frames and having a central chamber flanked by two "steering clutch" chambers each having openings to said central chamber and to an associated one of said track frames, said "steering clutch" chambers otherwise being sealed;
    a pair of hydraulic motors, one in each "steering clutch" chamber and each having a rotatable output shaft;
    means establishing a driving connection from each of said hydraulic motors to the track chain on the associated track chain through the opening thereto;
    means establishing a seal about each of said driving connections for precluding entry of foreign matter therearound into the associated "steering clutch" chambers;
    a pair of diaphragm means, one for each "steering clutch" chamber, sealingly closing the associated opening to said central chamber; and
    a body of liquid within and filling each "steering clutch" chamber,
    whereby pressures external of said "steering clutch" chambers are transmitted to the interiors thereof.

2. A crawler-type traction unit according to claim 1 wherein each of said hydraulic motors extends partially through the opening of its associated "steering clutch" chamber into said central chamber and wherein each of said diaphragm means comprises a bellows located within said central chamber and surrounding the opening thereinto from the associated "steering clutch" chamber as well as the portion of the associated hydraulic motor extending into the central chamber.

3. A crawler-type traction unit according to claim 1 wherein each of said driving connection establishing means includes a conventional drive chain drive sprocket, a conventional gear for driving the sprocket, and a conventional pinion in engagement with said gear and further includes a coupling directly interconnecting the rotatable output shaft of the associated motor with said pinion.

4. A traction unit according to claim 1 wherein said hydraulic motors are adapted to be energized independently of each other.

* * * * *